Feb. 23, 1932.  A. R. PARKER ET AL  1,846,978
METHOD FOR BURNING FLUID FUEL
Filed Oct. 2, 1925  5 Sheets-Sheet 1
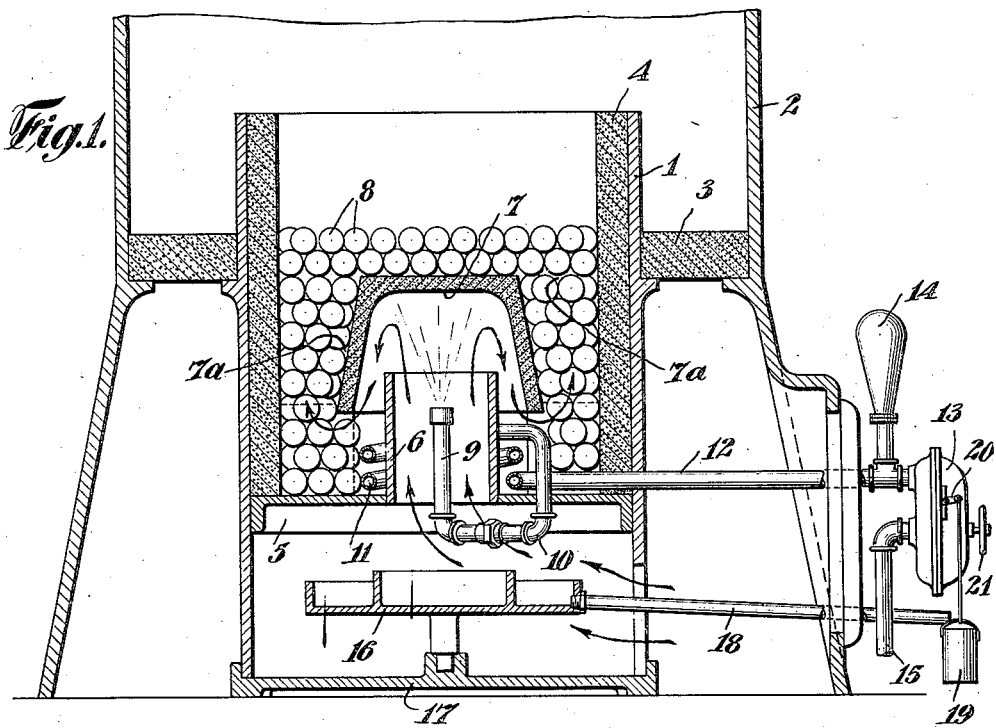
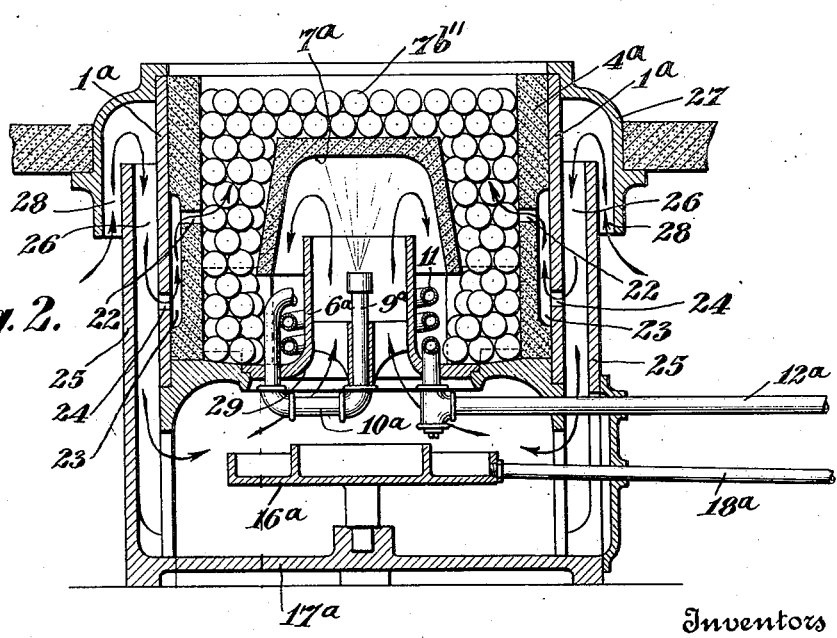
Inventors
John A. MacCormack
Arthur R. Parker
Reginald J. S. Pigott
Attorney Ramsay Hoguet Feb. 23, 1932.    A. R. PARKER ET AL    1,846,978
METHOD FOR BURNING FLUID FUEL
Filed Oct. 2, 1925    5 Sheets-Sheet 2
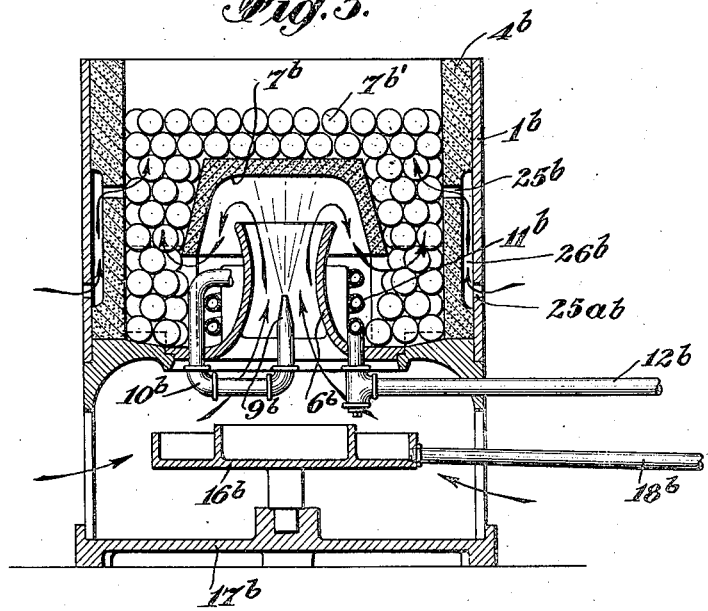
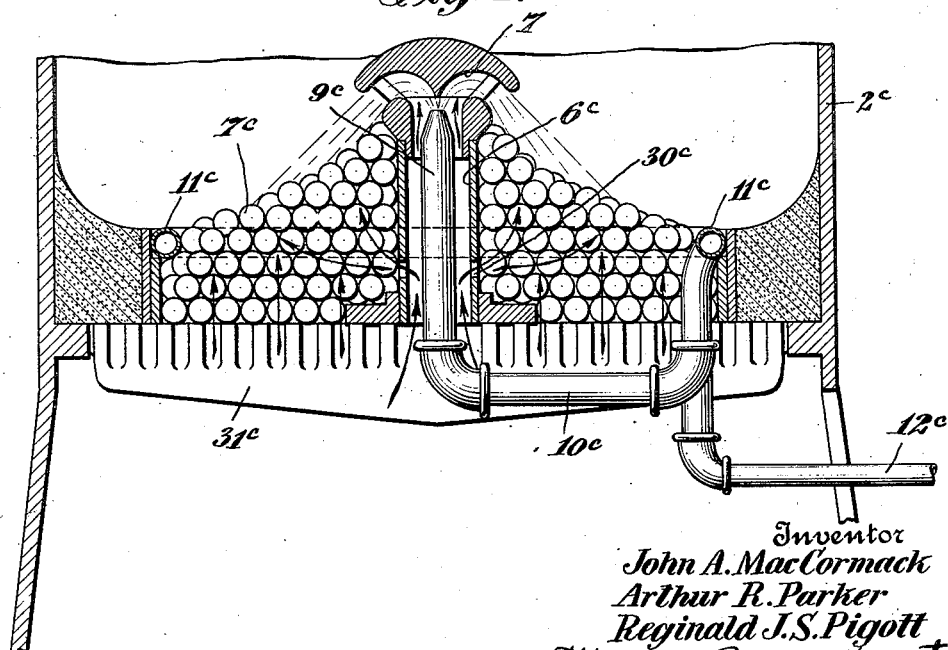

Feb. 23, 1932.   A. R. PARKER ET AL   1,846,978
METHOD FOR BURNING FLUID FUEL
Filed Oct. 2, 1925   5 Sheets-Sheet 3

Inventors
John A. MacCormack
Arthur R. Parker
Reginald J. S. Pigott
Attorney Ramsay Hoguet Feb. 23, 1932.  A. R. PARKER ET AL  1,846,978
METHOD FOR BURNING FLUID FUEL
Filed Oct. 2, 1925   5 Sheets-Sheet 4
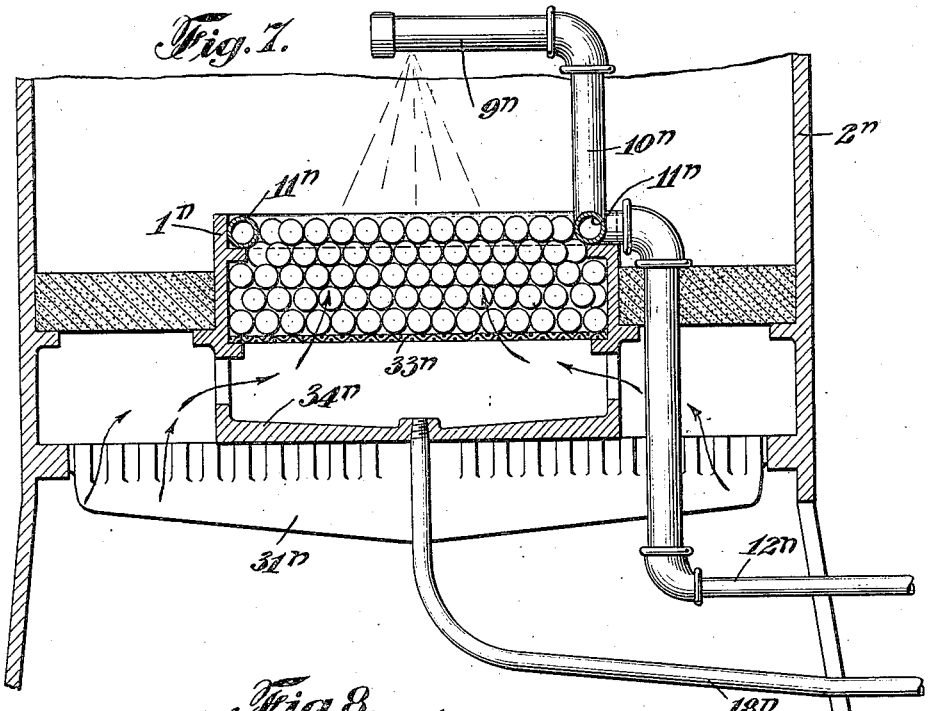
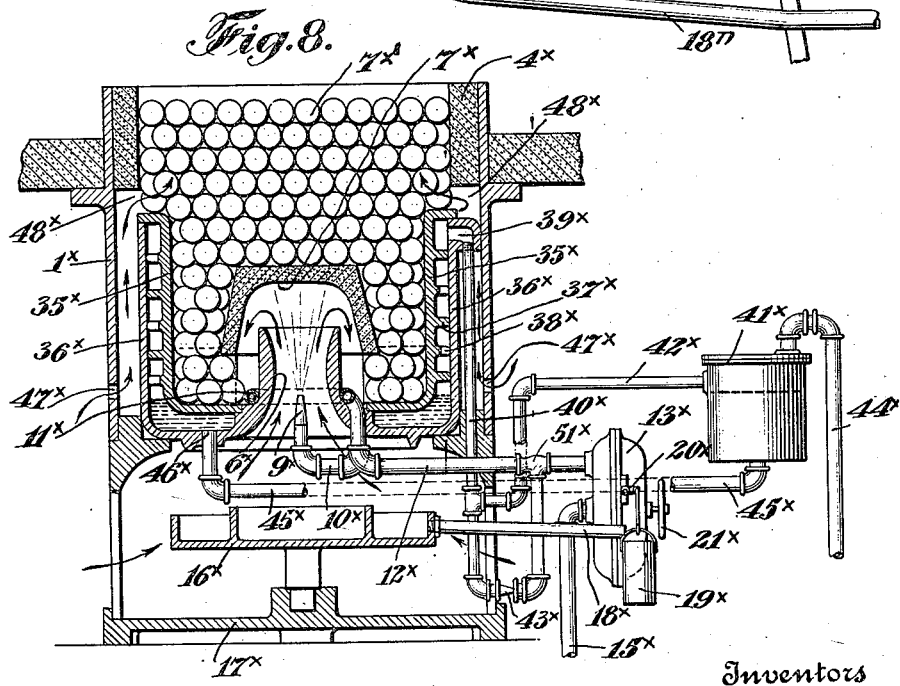
Inventors
John A. MacCormack
Arthur R. Parker
Reginald J.S. Pigott
Attorney Ramsay Hoguet Feb. 23, 1932.  A. R. PARKER ET AL  1,846,978
METHOD FOR BURNING FLUID FUEL
Filed Oct. 2, 1925  5 Sheets-Sheet 5
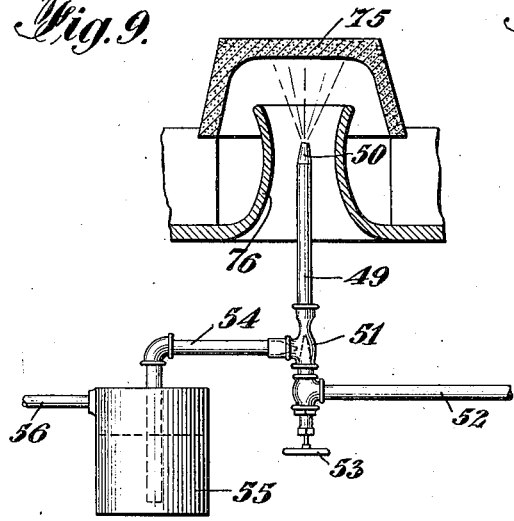
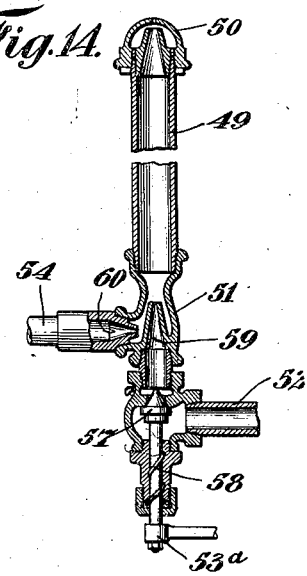
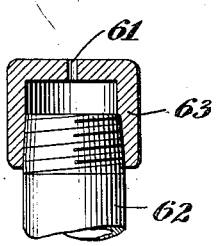
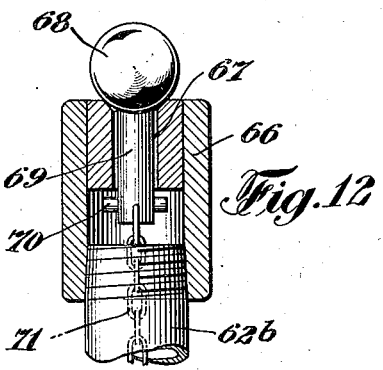
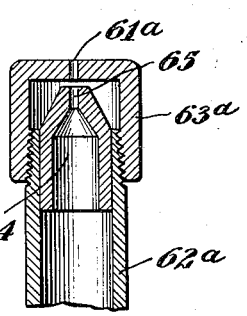
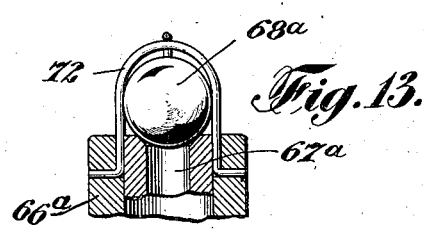
Inventors
John A. MacCormack
Arthur R. Parker
Reginald J.S. Pigott
Attorney Ramsay Hoguet Patented Feb. 23, 1932

1,846,978

UNITED STATES PATENT OFFICE

ARTHUR R. PARKER, OF BRIDGEPORT, CONNECTICUT; JOHN A. MacCORMACK, OF BLOOMFIELD, NEW JERSEY; AND REGINALD J. S. PIGOTT, OF NEW YORK, N. Y.

METHOD FOR BURNING FLUID FUEL

Application filed October 2, 1925. Serial No. 60,043.

This invention relates to a method of burning fluid fuel and is particularly illustrated by the application of the principle to the burning of oil.

It has been long desired in the art to produce a burner for fluid fuel which would use very low pressures and be without moving parts or auxiliaries so that there would be freedom from mechanical and operating troubles. By employing the principle of our invention as it will hereafter be disclosed we produce a burner of very simple construction having among others the attributes before mentioned and which gives a maximum heating effect per unit of fuel without sooting and with minimum stack and flue losses. The conditions necessary for such results require that there be the maximum intermixture of fuel and air which in turn necessitates that the fuel be very finely divided, vaporized or atomized in order that each particle may come in contact with the necessary air for combustion and where this occurs there is complete combustion with the greatest degree of radiation and an absence of flame. Therefore, the correct air supply for any given rate of fuel feeding becomes of great importance, for if there is too little air, combustion will be incomplete with probable ignition of unburned gases in the flue and stack and much sooting will follow; the result of these conditions being considerable losses and low effectiveness of the burner. On the other hand, an excess of air will cause heat losses due to the heating of this excess air without corresponding combustion effect. It is one of the aims of our invention always to provide the correct amount of air for combustion under all operating conditions. Furthermore, when the fluid fuel is used not only must the correct amount of air be supplied in intimate mixture with the fuel, but the combustion when once initiated, must be sustained so that there is no sensible lowering of the temperature by absorption of heat due to the admission of cold air, contact with cold parts of the combustion chamber or contact with the heating surface of any apparatus such as a boiler and the mixture must be kept at high temperatures at all times. In the particular form in which we have chosen to illustrate our invention we utilize a high velocity jet which is completely surrounded by induced air and we cause this mixture to impinge upon the surface of an auxiliary chamber or hood which effects, in the first place, a degree of turbulence, uniform distribution of the mixture and a degree of mixing. After this impingement and distribution the further turbulence and mixing is created by reversing the direction of the mixture and passing it into a secondary combustion chamber where the direction is again reversed. This secondary chamber contains a number of elements of substantially equal size so that the voids between them are approximately equal and for purposes of illustration we show these elements as being composed of refractory material in substantially spherical form, so that the passages between them are irregular, substantially equal and offer uniform resistance to the flow of the mixture which will be accordingly divided into a plurality of substantially equal streams flowing or moving in tortuous or winding paths. By having the voids practically equal in resistance to fluid flow throughout the mass of refractory material, the distribution of the mixture is equalized throughout that mass and the combustion as previously described from the high velocity jet is completed in this secondary combustion chamber with the result that the refractory material will become incandescent without appreciable flame beyond the refractory and with a maximum of radiant heat. Furthermore, we may if it is desirable introduce a part only of the air required for complete combustion around the high velocity jet, introducing at the proper point in the secondary chamber, a controlled amount of secondary air either preheated or at room temperature. The point of entrance of this secondary air is preferably at a point below the top of the refractory material. The effect of this secondary air and the method of its introduction permits of an intimate mixing with the partially burned fuel mixture and assists in providing a practically complete combustion at a nearer point in the passage of the fuel through the secondary chamber. Inasmuch as the intimate mixture of fuel and air is an essential to complete combustion, we can further aid this combustion by preheating the fuel within either of the combustion chambers or by other means, although the former is preferred and by so preheating the velocity of the issuing fuel is greatly increased without increasing the initial fuel pressure and in this manner very fine division of the fuel may be obtained or if sufficiently preheated, the fuel may be completely gasified. As a further aid to a fine division of the fuel we may introduce superheated steam which has the advantage of not only atomizing and vaporizing the fuel through forming what may be termed an emulsion therewith, but also assists in maintaining the temperature of that fuel. It would be noted that the degree of superheat which we prefer to utilize is such that after coming in contact with the fuel there is a considerable degree of superheat remaining in the steam which has the function of sustaining the temperature of the combustible mixture after issuance to prevent condensation of either fuel or mixture when the air of combustion is introduced or where cold portions of the furnace or neighboring parts are contacted. Furthermore, while we propose to illustrate our invention by the use of oil as a fuel, it will be understood that we are not limited in this regard, but may use other fuels with equal facility, such as gas, powdered coal or any fuel which may be of fluid form or which may be handled as a fluid. Other and further advantages will appear in the following specification and drawings.

Figure 1 is a section in elevation of a furnace embodying our invention.

Figure 2 is similar to Figure 1, except that the introduction of secondary air is shown.

Figure 3 shows the application of a convergent-divergent type of tube with secondary air.

Fig. 4 is a sectional elevation of another modified furnace illustrating the application of the principle of our invention.

Fig. 7 is a section in elevation of a still further modified construction illustrating the application of the principle of our invention.

Figure 8 is a furnace employing a convergent-divergent type of tube, with superheated steam and secondary air.

Figure 9 is a variation of Figure 8 illustrating the use of superheated steam.

Figures 10 to 13 are variations in the types of nozzle tubes.

Figure 14 shows a variation in the type of burner for use with steam.

Figure 5:
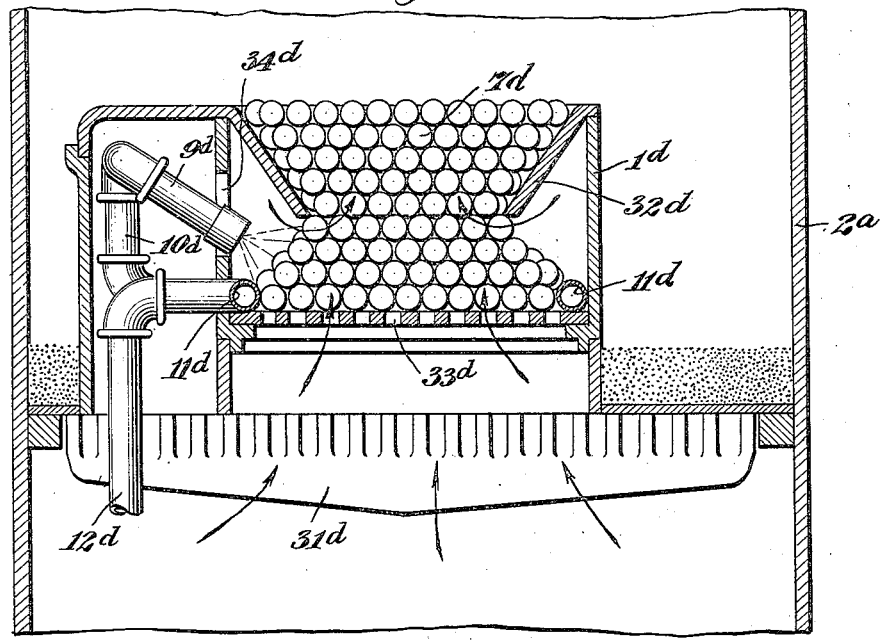
Fig. 5 is a sectional elevation of still another modified furnace illustrating the application of the principle of our invention.

In Figure 1 is shown a casing 1, which may be set within a boiler shell or the like 2, having blocks 3 to prevent influx of air. The casing 1 may be insulated as at 4 with fire brick or other heat insulating material as is common in the art and this lining 4 may rest upon a plate 5 through the center opening of which is the tube 6. Over the tube 6 and supported on the plate 5 in a suitable manner is the part or hood 7 which forms the primary combustion chamber. Filling the remaining space within the furnace are the elements 8 which we prefer to have in substantially spherical form and which may be of any suitable refractory material, although it will be understood that any material may be used which will withstand high temperatures and which can be formed so that the voids between the individual members of the mass will be practically equal. Within the tube 6 is a nozzle 9 preferably placed concentrically therewith and connected with the pipe 10 which in turn forms part of the coil 11 which we show as being placed around the tube 6. The pipe 12 connects with the coil 11 and also with the valve 13. Between the valve 13 and pipe 12 is placed a dome or the like 14 for a use to be hereafter described. Also leading to the valve 13 is the pipe 15 coming from the source of oil supply. Underneath the nozzle 9 we place a drip pan or container 16 which rests upon the base plate 17 of the furnace as shown. From this pan the pipe 18 leads and is so arranged that it will empty into the container 19 depending from the arm 20 of the valve 13 as shown. The hand valve 21 of the valve 13 controls the flow of the fuel from pipe 15 and this is the only manual control necessary for our burner. It will be understood that the pipe 15 supplies oil to the burner and this oil need only have a pressure equivalent to a head of three or four feet, although higher pressures may be used if it is so desired. In starting up this burner the valve 21 is opened whereupon cold oil will flow through the pipe 15 into the valve 13, through the pipe 12 and the coil 11 and the nozzle 9 and will drop down into the pan 16 where it collects. This collected oil is then ignited, and serves the double purpose of lighting the oil at the nozzle 9 and also somewhat heating the pipe 10. As ignition takes place, air flow will be induced through the pipe 6 and combustion will occur in the primary combustion chamber 7, the products passing out through the refractory material in the secondary combustion chamber which we may designate as 7a. As combustion progresses the temperatures will rise with the result that the oil in the coil 11 will become vaporized and issue from the nozzle 9 at high velocity and as this velocity increases up to its maximum, depending upon the amount of oil admitted, the supply of air through the tube 6 will be increased in proportion so that the entire mixture will impinge on the surface 7 and be evenly distributed and mixed while burning. The products of combustion then reverse their direction and pass downward and into the secondary combustion chamber 7a which produces further turbulence and mixing with increase of combustion until these products enter between the spaces of the spherical refractories. These spaces or voids being practically equal, the mixture will distribute itself throughout the mass thereof and be further mixed so that before the mixture reaches the top layer of refractories, the combustion is complete and no flame will appear but the upper portion of the refractory mass will become incandescent. Since the flame does not extend beyond the upper surface of the refractories, combustion is complete before leaving the refractories, and it is therefore impossible for any soot formation to occur on any cool surfaces met with, due to their chilling effect extinguishing a part of the flame. The use of the valve 13, while not essential to the action of our invention, is obvious as a safety device for the reason that if the nozzle 9 should fail to function at first, or should there be a leakage in the fuel line or for any reason fuel should collect in the pan 16, such fuel will flow through the pipe 18 into the container 19 and as this container 19 fills, it will depress the lever 20 and shut off the fuel from the pipe 15: Therefore no further fuel can flow to the nozzle 9 until the cause of the flooding has been removed and the valve 13 manually reset. As stated, the oil is preheated or vaporized in the coil 11 and this vaporization is ordinarily liable to cause surging in the supply line 12. That is, a portion of fuel may suddenly become vaporized, its pressure rise and a surge will be created in pipe 12. Then as this vaporized fuel passes out of the nozzle 9, a fresh supply may surge forward through pipe 12 and the operation be repeated. To overcome this difficulty and to permit of smooth operation, we insert a dome 14 in which is an air cushion and this air cushion so equalizes these surges that the operation of the burner is quiet and even. It will be clear that other valves or means may be supplied to regulate the fuel flow and other means than an air cushion used to suppress surging without affecting the operation of the burner and it will also be seen that this burner operates with a gravity flow of fuel and without auxiliary apparatus or moving parts. The combustion is complete for all rates of fuel flow and there are none of the disadvantages commonly found in other oil burners.

In Figure 2, the same principle is carried out with the addition that we show in this instance the use of secondary air which is heated prior to its entrance into the secondary combustion chamber 7b. This modification necessitates the lining 4a having openings such as at 22 and air passages connecting therewith as at 23. Likewise the shell 1a has openings 24 and is surrounded by a casing 25 which forms air passages 26. In this connection we prefer to use a member 27 through which air is taken in the passage 28. In all other respects the burner is the same and the method of combustion is carried on in the same manner with the addition that the air in passing through the passages 28, 26 and 23 is heated by the conduction of heat from the burner and passes into the secondary combustion chamber 7b through the opening 22 in the lining 4a. The openings 22 are preferably somewhat below the uppermost zone of combustion so that this secondary air is distributed throughout the secondary combustion chamber (there being a multiplicity of openings 22), so that this air will mingle intimately with the mixture in the process of combustion. This secondary air is in addition to the primary air induced by the velocity of the jet through the tube 6a, and therefore provides the capacity for completely burning a larger quantity of fuel, thus increasing the capacity of the burner. It will be noted in this Fig. 2 that tube 6a has a somewhat different form from tube 6 of Fig. 1, in that the lower corners 29 are rounded, to increase the induction effect of the fuel jet 9a, so that a larger amount of air is drawn in for a given quantity of fuel. The same parts may be affixed to the pipes 12a and 18a as were supplied to the similar pipes in Figure 1, or any other equally efficient parts may be used.

In Figure 3 a further variation is indicated and which lies principally in the form of the tube 6b, the other elements shown on Fig. 3 being similar to those of Fig. 2 and indicated by like reference numerals plus exponent b. Figure 1 shows a straight tube and will provide a satisfactory operation but in the tube of Figure 3 we have supplied a convergent-divergent nozzle with the result that a still greater quantity of air may be induced through this tube for a given jet velocity or quantity of fuel. This variation in no way affects the principle of our invention for while we show here in Fig. 3 the use of secondary air, as in the case of Fig. 2, this burner will operate satisfactorily without the use of such secondary air, although it is preferable to use it for higher capacities.

Figure 4 is another variation, wherein the nozzle 9c induces the main supply of air through tube 6c which has openings 30c which supply part of the secondary air to the mass of refractory material, the remainder of the secondary air being supplied through the grate 31c. The primary combustion chamber 7c in this instance is in somewhat different form, but provides the same functions of turbulence and reversal of flow, which take place on or slightly below the top surface of the refractory material where it meets the upward flowing currents of secondary air. This meeting of the downward flow of mixture and the upward flow of secondary air provides the usual mixing and complete combustion will take place in the secondary combustion chamber of the figures just described. The combustion in this instance will occur on and slightly below the surface of the refractory material and will be completed there by the intermixture of the up-flowing secondary air. While it is possible to have the coil 11c closer to the tube 6c, as previously illustrated, we show it on the outer boundaries of the refractory, although it might well be located nearer the center if so desired. Again we see in this Figure 4 the induction of air by jet velocity, turbulence and mixing, followed by a reversal of flow, a heating with the refractory material having equally spaced voids with distribution and mixture and a secondary reversal of flow.

In Figure 5, a still further variation is applied to the grate 31d and here the casing 1d has a hopper like arrangement 32d in which the refractory material is placed and which spreads on the grate 33d. Here the jet does not induce the air through a tube, but rather induces a certain portion through the opening 34d, the remainder being supplied through the grate 33d under the action of suitable draft. The fuel being thoroughly vaporized in the coil 11d as before, it will enter the body of refractory in highly atomized or vaporized form and be distributed therethrough in the voids between the spheres to meet the upcoming air. Because of the spherical form of this refractory material and the tortuous channels through which the fuel and air must travel, the mixture will be very complete, the combustion finished and no flame will appear above the burner.

Figure 6:
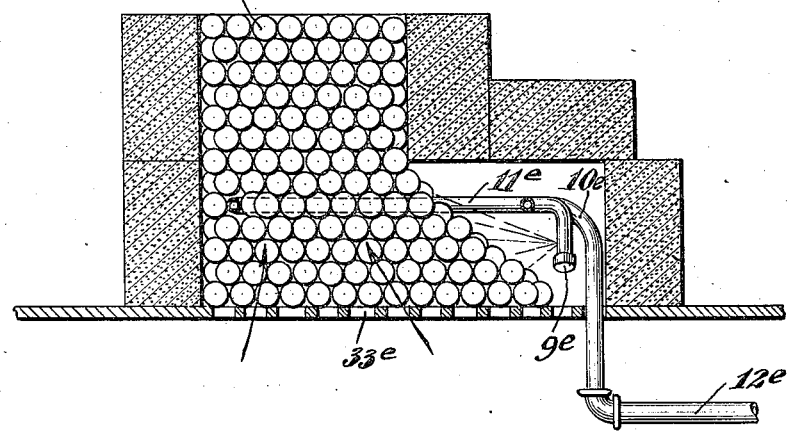
Fig. 6 is a section in elevation of a further modification illustrating the application of the principle of our invention.

In Figure 6, the principle is varied by having the highly atomized or vaporized fuel from the coil 11e and the nozzle 9e impinge upon the refractory material in a direction substantially horizontal, while air through the grate 33e, is induced by the draft. Hence this highly atomized fuel is completely mixed with the air in the upward passage through the tortuous channels between the refractory materials 7e; the distribution being uniform because of the substantial equality of voids heretofore described. Here again we have the turbulence, thorough mixing and change of direction and the same combustion characteristics as in the other variations. It will be noted in this figure that the coil 11e passes back around through the refractory and forward to meet the nozzle 9e which is bent at an incline to the coil as indicated, the figure showing only the back portion of the coil and the front portion in section.

In Figure 7 the application is somewhat similar to Figure 4, except that the fuel is applied directly upon the bed of refractory where the turbulence occurs, mixing the upcoming currents of air through the grate 33n with the highly atomized or vaporized fuel below the surface of the refractory bed; this application showing the use of the burner associated with a grate 31n and having a lower chamber 34n, with the overflow pipe 18n for use in starting and to control overflow or flooding conditions as in the case of Figure 1.

The modification shown in Figure 8 embodies features shown in Figures 1, 2 and 3, with the addition that we utilize superheated steam as a preheating and atomizing or vaporizing agent. The formation of the primary combustion chamber and the secondary chamber 7x are each similar, except that the lining of part of the secondary combustion chamber is formed of an inner portion 35x and an outer portion 36x which together form a water tight container which also covers a part of the bottom of the secondary combustion chamber. In the form in which we show this water jacket there are baffles or separators 37x and 38x which are so arranged that there is free passage around them from one space to another as indicated. This jacket has an exit passage 39x into which enters the pipe 40x having a connection to the water container 41x through pipe 42x which will be known hereafter as the equalization pipe. The pipe 40x extends downward and connects with a check valve which may be positioned at the point 43x and from there leads into the pipe 12x at the injector 51x which has a connection with the valve 13x. The pipe 12x to the burner, the vaporizing coil 11x and the nozzle 9x are as previously described, it being noted that we prefer to use in this instance the tube 6x of the convergent-divergent type. Water container 41x has a supply pipe 44x and a control means not shown, such as a ball float, for maintaining a constant level while from the bottom leads pipe 45x which enters the jacket at a lower point, such as at 46x. We also use in this instance preheated secondary air which enters the side of the casing 1x at an opening such as at 47x and is passed into the secondary combustion chamber 7x at selected points such as 48x. In operation, the burner is started as in other instances by igniting overflow oil which collects in the pan 16x when the valve 21x is open. Water is in the water jacket as indicated to a level predetermined by the control means in the water container 41x and remains at that predetermined level throughout. As combustion progresses through the primary and secondary combustion chambers the fuel will become vaporized and steam will form in the water jacket and become highly superheated due to the large area exposed to the heat of the secondary combustion chamber. This superheated steam passes through to the injector 51x and in so doing draws with it the required amount of fuel through the pipe 15x and the valve 13x by means of the injector 51x.

As the superheated steam meets the oil the two will pass together through the pipe 12x and in this passage the oil becomes heated and vaporized and the steam will lose a portion of its superheat in heating the oil, but as before mentioned this superheat is of such degree that no condensation occurs during the process. The superheated steam and vaporized oil pass through the coil 11x where they receive additional heat and they then pass out of the nozzle 9x at high velocity and in intimate mixture. Thereafter the action is as described before, which includes turbulence, reversals of direction and passage through the substantially equal and tortuous channels of the refractory material so that the combustion which is initiated in the primary combustion chamber 7x, progresses in the lower part of the secondary combustion chamber and is completed in the upper part of the chamber where the secondary pre-heated air enters. Because of the high degree of superheat used, a portion of which only is used in heating and vaporizing the fuel, a considerable degree of superheat remains when the mixture emerges from the nozzle, so that there can be no condensation in the mixture upon contact with the cooler induced air. Besides complete vaporization, the presence of superheated steam greatly aids combustion, and prevents the formation of soot or smoke. The presence of superheated steam with the oil in coil 11x, also prevents the formation of any deposit of carbon or harmful material in the coil.

In Figure 9 we show a type of burner which may be used with any of the foregoing variations in conjunction with superheated steam, although for purposes of illustration we show it in diagrammatic form only. This burner, which is shown in detail in Figure 14, comprises a tube portion 49 and a top portion 50 and a body portion 51 which acts as an injector. Superheated steam may be supplied by the pipe 52 and controlled by a valve subsequently described. The oil enters through the pipe 54 from any given container 55 which in turn is supplied by the pipe 56; the oil level in container 55 being maintained constant by any suitable means such as a float. This burner nozzle as shown in Figure 14 has a quick acting valve 57, moved by the threads 58 through the handle 53a. As steam is admitted through the pipe 52 it will pass into the tube 49 and through the tip 50. The velocity of the steam through the jet 59 creates a vacuum in the body of the portion 51 and this will draw oil through the pipe 54 and the jet 60 and because of the relative location of these jets 59 and 60 of predetermined sizes, the amount of oil drawn in will be at all times proportional to the amount of steam passing through the body 51. Therefore we control the rate of combustion entirely by controlling the steam so that a burner embodying these features will accomplish a degree of combustion beyond what has yet been possible with but one control; namely a control of the steam only, which may be accomplished in a variety of ways such as by a thermo-couple, or by pressure means or other regulating devices.

In Figures 10 to 13, we show a variety of tips which are suitable for the nozzles in our burner. In the nozzle of Fig. 10 the fluid fuel will be atomized in the form of a cone wherein the velocity of the fuel is retained and the opening 61 is made small enough to atomize the fuel, but large enough to prevent clogging as some of the fuel coming through the pipe 62 to the cap 63 may have some carbon in it from the vaporizing coil when such a coil is used. The same principle is carried out in Figure 11, except that we place within the pipe 62a a supplementary tip 64 which has an opening 65. The openings 61a and 65 are in alignment, but 65 is somewhat larger than 61a with the result that part of the fuel stream will impinge upon the edges of opening 61a and thus give a wider cone of atomized fuel than was the case with the tip shown in Figure 10, although the velocity of the stream will be retained. In Figure 12, we show the pipe 62b having an extended portion 66 with the central opening 67. Seated in the opening 67 is a ball 68 having a downwardly extending connecting stud 69 through which is the pin 70. The action of this tip is to create a wide cone of very finely atomized fuel in cloud form which is particularly effective when steam, and particularly superheated steam is used. In producing this cloud some of the velocity is naturally lost so that to obtain the best results with such tubes, it is preferred that they be operated at higher pressures. Depending from the stud 70, we may place a chain or similar device such as at 71. This chain would serve the purpose of keeping the pipe 62b free of carbon and foreign material which might adhere to the inner surface of the pipe. This can be accomplished by agitation or vibration of the chain due to the velocity of the fluid passing through the pipe and this vibration of the chain would naturally throw it about within the pipe to remove any adhering substance from the surface thereof.

In Figure 13 the same principle is applied as in Figure 12, except that we use a cage 72 to limit rise of the ball. This cage 72 performs the same function in this instance as the pin 70 in Figure 12 and the same jet characteristics will be obtained.

It will be evident from the foregoing description of our burner and its modifications that they may be controlled by the control mechanism shown in Figure 1 or any similar or equally efficient device and that all of the variations may be used with or without superheated steam and any of the tips shown in Figs. 9 to 14, inclusive, are interchangeable in each instance with each of the variations of the burner which we have described. In fact we may adopt any of the combinations set forth and any of the part or parts described in any one of the variations according to the demand and conditions to be met and we do not limit ourselves in this regard. Furthermore, we have assumed throughout for the purposes of illustration that the stack or flue draft has been such as to be proper for the combustion conditions. This is a matter of supplemental manual or automatic control and does not enter into our invention other than to assume that such draft would be maintained at the proper condition by one skilled in the operation of burners. It is evident that our invention as disclosed is susceptible to great variety of changes and adaptations and we include all such changes and adaptations within the scope of our claims, for the foregoing specification with its drawings has been made for the purpose of illustration only.

We claim:

1. The method of burning fluid fuel which comprises forming a combustible mixture of fuel and air, igniting and causing said mixture to impinge upon a surface, reversing the direction of the flow of the mixture, again reversing the direction of flow and thereafter dividing the mixture into a plurality of substantially equal streams flowing in tortuous paths.

2. The method of burning fluid fuel which comprises forming a combustible mixture of said fuel and air, igniting and partially burning said mixture in a primary combustion chamber, reversing the flow of said partially burned mixture, again reversing the direction of flow to a secondary combustion chamber and therein dividing the mixture into a plurality of equal streams flowing in tortuous paths.

3. The method of burning fluid fuel which comprises combining the fuel with a combustion supporting medium, igniting and mixing the fuel and said medium by turbulence and change of direction, causing a further mixture by another change of direction and then dividing the mixture into a plurality of substantially equal streams flowing in tortuous paths.

4. The method of burning fluid fuel which comprises supplying the necessary air in proportion to the amount of fuel to be burned, igniting and causing the fuel and air to impinge upon a surface to create turbulence and mixing, reversing the flow of the mixture, again passing the mixture in a reverse direction and dividing it into a plurality of substantially equal streams flowing in tortuous paths.

5. The method of burning fluid fuel which comprises atomizing the fuel, using the velocity of the atomized fuel to induce a flow of air and mix air with the fuel, igniting and causing said mixture to impinge upon a surface, reversing the flow of the mixture, again reversing the flow of the mixture and then dividing the mixture into a plurality of substantially equal streams flowing in tortuous paths and admitting air to said streams.

6. The method of burning fluid fuel which comprises forming a mixture of fuel and superheated steam with air, igniting and then causing said mixture to impinge upon a surface, twice reversing the direction of flow thereof and thereafter dividing the mixture into a plurality of substantially equal streams flowing in tortuous paths.

7. The method of burning fluid fuel which comprises forming a mixture of fuel and superheated steam with air, igniting and then causing said mixture to impinge upon a surface, twice reversing the direction of flow thereof, dividing the mixture into a plurality of substantially equal streams flowing in tortuous paths and admitting other air to said streams.

8. The method of burning fluid fuel which comprises forming superheated steam, utilizing the velocity of the steam to draw fluid fuel into a combustion zone, subjecting said steam and fuel to additional heat to raise their temperature, forming a mixture of the steam and fuel with air, causing ignition and thereafter dividing the mixture into a plurality of substantially equal streams flowing in tortuous paths.

9. The method of burning fluid fuel which comprises igniting the fuel in the presence of air, subjecting the ignited fuel to reversals of direction of flow and subsequent division into a plurality of substantially equal streams flowing in tortuous paths.

10. The method of burning fluid fuel which comprises igniting a mixture of fuel and air, causing the ignited mixture of fuel and air to impinge upon a surface and thereafter dividing the mixture into a plurality of substantially equal streams flowing in tortuous paths.

11. The method of burning fluid fuel which comprises igniting a mixture of fuel and air, causing the ignited mixture of fuel and air to impinge upon a surface, dividing the mixture into a plurality of substantially equal streams flowing in tortuous paths and admitting additional air to said streams.

12. The method of burning fluid fuel which comprises igniting a mixture of fuel, steam and air causing the ignited mixture of fuel, steam and air to impinge upon a surface and thereafter dividing the mixture into a plurality of substantially equal streams flowing in tortuous paths.

13. The method of burning fluid fuel which comprises igniting a mixture of fuel, steam and air causing the ignited mixture of fuel, steam and air to impinge upon a surface, dividing the mixture into a plurality of substantially equal streams and admitting additional air to said streams.

In testimony whereof, we have signed our names to this specification this 30th day of September, 1925.

ARTHUR R. PARKER.
JOHN A. MacCORMACK.
REGINALD J. S. PIGOTT.